(12) United States Patent
McVeigh et al.

(10) Patent No.: US 6,351,567 B1
(45) Date of Patent: Feb. 26, 2002

(54) EFFICIENT ENCODING OF VIDEO BLOCKS

(75) Inventors: Jeffrey S. McVeigh, Portland; Michael Keith, Salem, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/219,741

(22) Filed: Dec. 22, 1998

(51) Int. Cl.[7] .............................. G06K 9/36; H04B 1/66

(52) U.S. Cl. .................. 382/238; 382/239; 375/240.02; 375/240.24

(58) Field of Search ................................ 382/238, 233, 382/239, 236; 709/247; 375/240.03, 240.2, 240.24, 240.02, 240.12, 240.13

(56) References Cited

U.S. PATENT DOCUMENTS 5,737,537 A * 4/1998 Gardos et al. .............. 709/247
5,847,776 A * 12/1998 Khmelnitsky et al. ...... 349/699

OTHER PUBLICATIONS

"Method for detecting all–zero DCT coefficients ahead of discrete cosine transformation and quantisation," Zhou Xuan et al., Electronics Letters, vol. 34, No. 19, Sep. 17, 1998, pp. 1839–1840.*

"Video Codec for Audiovisual Services at p x 64 kbits", *International Telecommunications Union, Recommendation H.261*, pp. 1–25, (1994).

Bist, A., et al., "Intelligent Pre–Quantization in Motion Compensated Video Coding", *Rockwell Semiconductor Systems,* ITU–Telecommunications Standardization Sector, Study Group 16; Question Q.15/16, Expert's Group on Very Low Bitrate Visual Telephony, Tampere, Finland, 5 p., (1998).

* cited by examiner

Primary Examiner—Wenpeng Chen
(74) Attorney, Agent, or Firm—Schwegman, Lundberg, Woessner & Kluth, P.A.

(57) ABSTRACT

A method for encoding video blocks. In one embodiment of the invention, a detector, which compares an observation value associated with each block in a video sequence to a probabilistic threshold in order to predict whether each block is empty or non-empty, is described.

5 Claims, 4 Drawing Sheets

EFFICIENT ENCODING OF VIDEO BLOCKS

FIELD

This invention relates to the compression of video signals, and more particularly it relates to detecting empty blocks in a video signal.

BACKGROUND

In a world wired for digital communication, the use of real time video encoders is becoming more common. For example, video encoders are used to prepare real time video images of exotic vacation spots for transmission to interested viewers having access to only a computer and a telephone line.

The process of encoding images in real time employs a great deal of computing power, and the computing power available to encode an image determines at least in part the amount of detail that can be included in the encoded image. For example, a thirty-two bit microprocessor running at 200 megahertz (MHZ) can successfully encode a 256×256 pixel real time video image, but to successfully encode a high resolution 1024×1024 pixel real time video image typically employs a sixty-four bit microprocessor running at 450 megahertz.

Various strategies have been developed to encode high resolution images while reducing the computing power employed. One strategy involves identifying video data blocks that are "empty" prior to encoding. A block is an array of pixels in a video frame. For example, in a video frame represented by a 1024×1024 array of pixels, a block within the video frame can be represented by an 8×8 array of pixels. An empty block is usually defined as a block that contains only zero-valued coefficients after a discrete cosine transform and quantization process are applied to the block. Such a block can be represented in a bitstream by a single bit indicating that the block is "empty." If an empty block is identified prior to when the discrete cosine transform and quantization process are applied to the block, then the block is not encoded and the computing power normally employed to encode the block is saved. The saved computing power may be applied to encoding a higher resolution image or it may be applied to encoding real time video frames at a higher rate.

One approach to identifying empty blocks prior to encoding is to characterize each block by a single numerical value, and then to compare that numerical value to a fixed threshold value. The fixed threshold value is selected to roughly identify a value that separates empty blocks from non-empty blocks. If the numerical value associated with the block is less than the fixed threshold, then the block is assumed to be empty and is skipped. If the numerical value is greater than the fixed threshold, then the block is assumed to be non-empty and is encoded. A problem associated with this approach is that in order to avoid mischaracterizing a non-empty block as an empty block, the fixed threshold is set unnecessarily low and empty blocks still end up being encoded. This unnecessary encoding wastes computing power.

For these and other reasons there is a need for the present invention.

SUMMARY

In one embodiment of the present invention, a residual video block is received, and a probabilistic threshold is employed to predict whether the block is non-empty without encoding the block.

DETAILED DESCRIPTION

In the following detailed description of embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present inventions. The following detailed description is, therefore, not to be taken in a limiting sense, and the scope of the present invention is defined only by the appended claims.

Figure 1A:
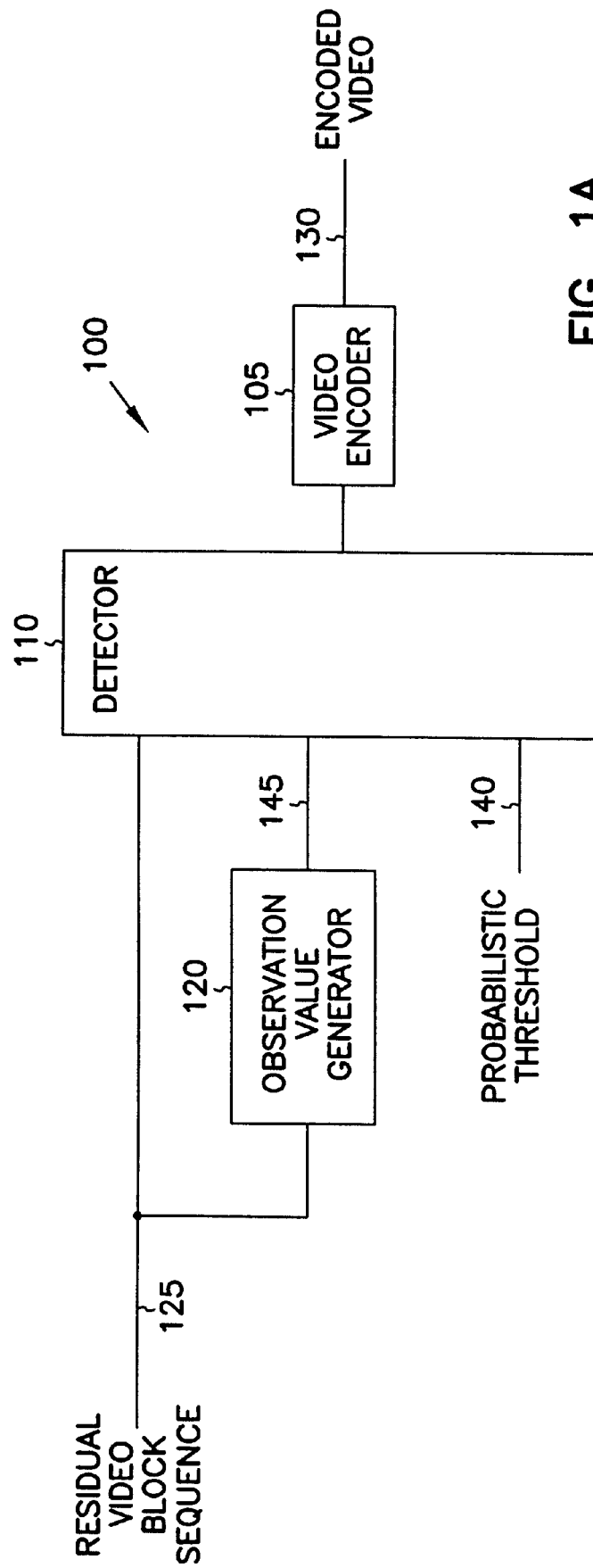
FIG. 1A is a block diagram of one embodiment of the video compression system of the present invention.

FIG. 1A shows one embodiment of video compression system 100. System 100 comprises video encoder 105, detector 110, and observation value generator 120. Video encoder 105 receives an input signal from the output port of detector 110, and detector 110 receives an input signal from the output port of observation value generator 120. Residual video block sequence 125 is an input signal to detector 110 and observation value generator 120. Encoded video 130 is an output signal of video encoder 105. Probabilistic threshold 140 is an input signal to detector 110.

Video encoder 105 processes a sequence of residual video blocks, which are the difference between the original blocks and the motion compensated predicted blocks, received from detector 110 to generate encoded video 130. For example, in one embodiment video encoder 105 applies a discrete cosine transform, followed by a quantizer, a run length encoder, and a variable length encoder to the sequence of blocks received from detector 110. A block is defined, in one embodiment, as comprising a set of pixels in a video frame. In an alternate embodiment, a block is defined as comprising an 8×8 array of pixels. The output signal of video encoder 105 is encoded video 130, which contains fewer bits than contained in the input sequence received from detector 110.

Detector 110 provides a sequence of blocks to encoder 105 for encoding. To generate this sequence, detector 110 compares the output signal of observation value generator 120 with probabilistic threshold 140 to determine whether each block in residual video block sequence 125 is empty or non-empty. An empty block is defined, in one embodiment, as comprising a block where all of the coefficients are zero after applying a discrete cosine transform and quantization to the block, and a non-empty block is defined as comprising a block where at least one coefficient of a discrete cosine transform of the block is non-zero after applying a discrete cosine transform and quantization to the block. If a block is empty, then the block is represented by a single bit in the bit stream to indicate that it is empty and is not passed to video encoder 105 for encoding. If a block is non-empty, then the block is passed to video encoder 105 for encoding. Detector 110, in one embodiment, identifies a block as empty when the output signal of observation value generator 120 is less than probabilistic threshold 140.

Observation value generator 120 provides observation value 145, which in one embodiment is an estimation of the likelihood that a block is empty, to an input port of detector 110. In this particular embodiment, observation value generator 120 characterizes a block in residual video block sequence 125 by associating the block with observation value 145, which is a numerical value. In one embodiment, observation value 145 is generated for a block by summing the absolute value of the pixel values of the block and dividing the sum by the quantization value used in the video encoder. The quantization value is a numerical value used in the quantizer of a video encoding system to reduce the dynamic range of the coefficients generated by the discrete cosine transform.

Figure 1B:
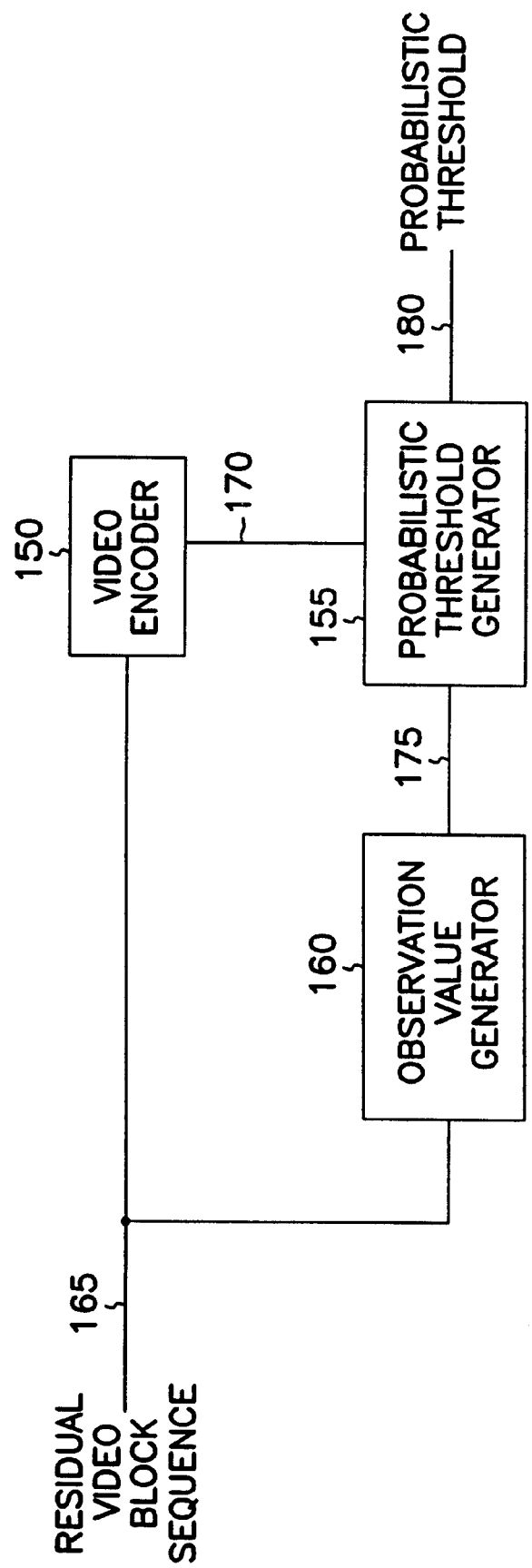
FIG. 1B is a block diagram of one embodiment of an initialization system of the present invention.

Probabilistic threshold 140, which in one embodiment defines a level for distinguishing between empty and non-empty blocks in residual video block sequence 125, is an input signal to detector 110. FIG. 1B shows one embodiment of a system for generating probabilistic threshold 180, which is suitable for use as probabilistic threshold 140 of FIG. 1A.

Referring to FIG. 1B, in one embodiment, video encoder 150 and observation value generator 160 provide input signals to probabilistic threshold generator 155. Video encoder 150 and observation value generator 160 receive as an input signal residual video block sequence 165. Video encoder 150 generates empty/non-empty state signal 170, which is received by probabilistic threshold generator 155. Probabilistic threshold generator 155 provides probabilistic threshold 180.

In one embodiment, observation value generator 160 receives residual video block sequence 165 and generates observation value 175 for each block. Observation value generator 160 operates in the same manner as observation value generator 120 of FIG. 1A, which is described above. Video encoder 150 receives residual video block sequence 165 and generates empty/non-empty state signal 170 for each block by determining whether each block, after processing by the discrete cosine transform and the quantizer, is empty or non-empty. Probabilistic threshold generator 155 receives empty/non-empty state signal 170 and observation value 175 and generates probabilistic threshold 180 by constructing two probability density functions, one for empty blocks and one for non-empty blocks. The probability density functions are constructed by constructing a histogram of a count of empty blocks as a function of the observation value 175 associated with the empty blocks and a histogram of a count of non-empty blocks as a function of the observation value 175 associated with the non-empty blocks.

In one embodiment, probabilistic threshold 180 is obtained by averaging two observational values. The first observational value is the maximum observational value having a non-zero count in the probability density function for the empty blocks. The second observational value is the minimum observational value having a non-zero count in the probability density function for the non-empty blocks. A count is the number of empty or non-empty blocks having a particular observational value in a probability density function.

In an alternate embodiment, probabilistic threshold 180 is the value that minimizes the probability of false alarms and misses, with respect to empty blocks. A false alarm occurs when a block that is not empty is identified as empty. A miss occurs when a block that is empty is identified as non-empty. For $pdf_{empty}(x)$, a probability density function that represents empty blocks, and $pdf_{non-empty}(x)$, a probability density function that represents non-empty blocks, probabilistic threshold 180 in FIG. 1B may be represented by T as in equation (1).

$$T = \min_{\arg T} \left\{ \sum_{x=0}^{T} pdf_{non-empty}(x) + \sum_{x=T}^{\infty} pdf_{empty}(x) \right\} \quad (1)$$

Figure 2:
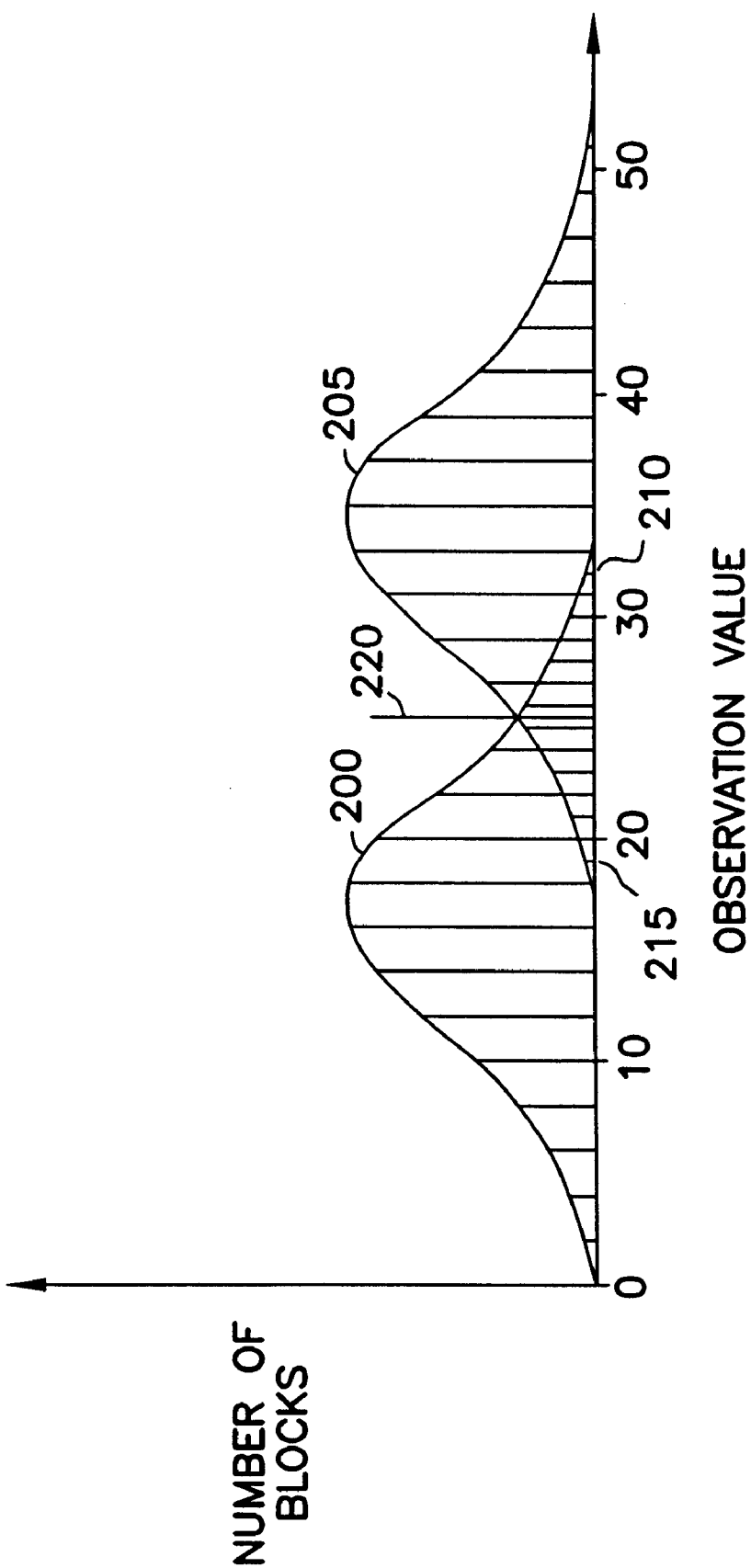
FIG. 2 is a graph of the empty block and non-empty block probability density functions associated with one embodiment of the present invention.

Referring to FIG. 2, an example of a graph of two probability density functions (pdfs) is shown. Probability density function 200 shows the probability of empty blocks for an associated observation value, and probability density function 205 shows the probability of non-empty blocks for an associated observation value. Probabilistic threshold 180 in FIG. 1B is derived from the pdfs shown in FIG. 2. Probabilistic threshold 180 can be computed as an average of the maximum range value of the probability density function for the empty blocks and the minimum range value of the probability density function for non-empty blocks. For example, in FIG. 2 maximum range value 210 for probability density function 200 is thirty-two and the minimum range value 215 for probability density function 205 is nineteen. So, in this example, probabilistic threshold 180 in FIG. 1B is twenty-five and one-half. The location of this value is illustrated by line 220 in FIG. 2.

An advantage of using computed probability density functions to calculate a threshold value in one embodiment is that the threshold value can be used to regulate the speed of the encoding process and the quality of the decoded video. For example, the speed of the encoding process is increased by setting the threshold value to a higher value of the probability density function for empty blocks. The quality of the decoded video is increased by setting the threshold value to a lower value of the probability density function for non-empty blocks.

An advantage of accurately detecting empty blocks prior to encoding in a residual video block sequence is that the encoding of the empty blocks can be avoided. Not encoding empty blocks increases the throughput of the video encoder. For example, if video encoder 105 of FIG. 1A, in one embodiment, is capable of processing ten-thousand blocks per second, and two-thousand blocks are empty, then by identifying the two-thousand empty blocks prior to encoding, the encoding of those blocks can be avoided and two-thousand new blocks can be encoded in their place, thus increasing the throughput of the encoder without degrading the quality of the encoded images.

Referring again to FIG. 1A, in one embodiment, system 100 is initialized by setting probabilistic threshold 140. After initialization, detector 110 processes residual video block sequence 125 in response to observation value 145 and probabilistic threshold 140. Blocks in residual video block sequence 125 that have an observation value 145 greater than probabilistic threshold 140 are identified as non-empty and are passed on to video encoder 105 for processing. Blocks in residual video block sequence 125 that have an observational value less than probabilistic threshold 140 are identified as empty and are not passed on to video encoder 105 for processing. Probabilistic threshold 140 can be reinitialized as often as desired in order to maintain the accurate identification of empty blocks. In one embodiment, probabilistic threshold 140 is reinitialized once every fifteen video frames.

The described embodiment exhibits a savings in computing power when compared with other video encoders. This savings may be quantified by establishing a test platform and then measuring the performance of three systems on the platform. In one such test platform, a sixty-four bit 450 megahertz (MHZ) microprocessor was employed, and the peak signal to noise ratio of the encoded video was maintained at a constant thirty-two decibels. A baseline for this test was established by selecting a video encoder that does not have the capability to detect empty blocks. A video sequence was selected to cause the selected encoder, which is operating on the test platform under the prescribed conditions, to use 100% of the computing power of the platform. Next, a video encoder having a fixed threshold for detecting empty blocks was selected. This encoder was operated under the test conditions described above. It was found to utilize 85% to 90% of the computing power of the microprocessor. Finally, a video encoder having a probabilistic threshold generator, an observation value generator, and a detector as described in an embodiment of the present invention was selected. This encoder was operated under the test conditions described above. It was found to utilize about 75% of the computing power of the microprocessor. The savings in computing power was about 10% for the described embodiment over the fixed threshold system in this test.

Figure 3:
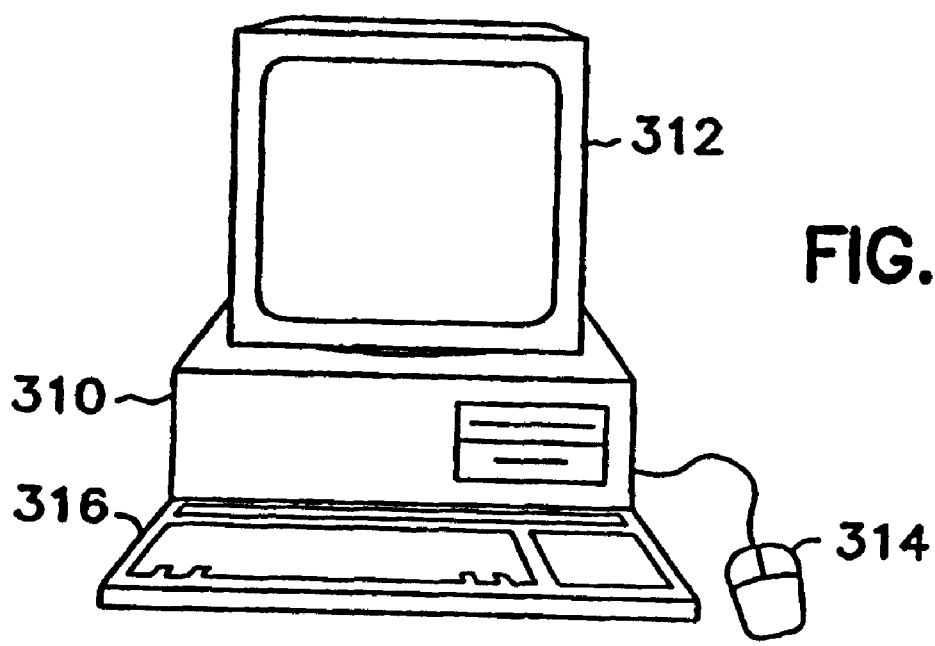
FIG. 3 is a diagram of an embodiment of a computer in conjunction with which embodiments of the invention may be practiced.

A representative computer, in conjunction with which embodiments of the invention may be practiced, is now described. Those of ordinary skill in the art will appreciate, however, that the invention is not limited to implementation in conjunction with a computer or this computer embodiment. Referring to FIG. 3, a diagram of the computer in conjunction with which embodiments of the invention may be practiced is shown. A digital processing apparatus, such as computer 310, is operatively coupled to monitor 312, pointing device 314, and keyboard 316. Computer 310 in this embodiment includes a processor, random-access memory (RAM), read-only memory (ROM), and one or more storage devices, such as a hard disk drive, a floppy disk drive (into which a floppy disk can be inserted), an optical disk drive, and a tape cartridge drive. The memory, hard drives, floppy disks, etc., are types of computer-readable media or program storage devices. The invention is not particularly limited to any type of computer 310.

Monitor 312 permits the display of information within a viewing area, including computer, video and other information, for viewing by a user of the computer. The invention is not limited to any particular monitor 312, and monitor 312 is one type of display device that may be used by the invention. Such monitors include cathode ray tube (CRT) displays, as well as flat panel displays such as liquid crystal displays. (LCD's). Pointing device 314 permits the control of the screen pointer provided by the graphical user interfaces. The invention is not limited to any particular pointing device 314. Such pointing devices include mouses, touch pads, trackballs, wheels, remote controls and point sticks. Finally, keyboard 316 permits entry of textual information into computer 310, as known within the art, and the invention is not limited to any particular type of keyboard.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A method comprising:

receiving a residual video block;

generating an observational value for the residual video block; and predicting whether the block is non-empty without encoding the block by comparing the observational value to a probabilistic threshold by generating the observational value from the block; and generating the probabilistic threshold from a probability density function by averaging a maximum range value of a probability density function of one or more empty blocks with a minimum range value of a probability density function of one or more non-empty blocks.

2. A method comprising:

receiving a residual video block sequence; and generating a probabilistic threshold from the sequence by averaging a maximum range value of a probability density function for one or more empty blocks with a minimum range value of a probability density function for one or more non-empty blocks.

3. A computer program product, comprising:

a program storage device readable by a digital processing apparatus; and a program of instructions tangibly embodied on the program storage device and executable by the digital processing apparatus to perform a method comprising:
receiving a residual video block;
generating an observational value for the residual video block;
predicting whether the block is non-empty without encoding the block by comparing the observational value to a probabilistic threshold by generating the observational value from the block; and
generating the probabilistic threshold from a probability density function by averaging a maximum range value of a probability density function of one or more empty blocks with a minimum range value of a probability density function of one or more non-empty blocks.

4. A system comprising:

a detector adapted to compare an observation value associated with a block in a sequence of empty and non-empty blocks to a probabilistic threshold to predict whether the block is empty or non-empty, wherein the probabilistic threshold comprises an average of a maximum range value of a probability density function of the empty blocks and a minimum range value of a probability density function of the non-empty blocks.

5. A system comprising:

a detector adapted to compare an observation value associated with a block in a sequence of empty and non-empty blocks to a probabilistic threshold to predict whether the block is empty or non-empty, wherein the observation value comprises a sum of an absolute value of pixel values associated with the block divided by a quantization value and the probabilistic threshold comprises an average of a maximum range value of a probability density function of the empty blocks and a minimum range value of a probability density function of the non-empty blocks.

* * * * *